United States Patent
Kozuka

(10) Patent No.: US 10,479,355 B2
(45) Date of Patent: Nov. 19, 2019

(54) DRIVING CONTROL SYSTEM FOR VEHICLE

(71) Applicant: TOYOTA JIDOSHA KABUSHIKI KAISHA, Toyota-shi, Aichi-ken (JP)

(72) Inventor: Tomoyuki Kozuka, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 189 days.

(21) Appl. No.: 15/648,708

(22) Filed: Jul. 13, 2017

(65) Prior Publication Data

US 2018/0029593 A1 Feb. 1, 2018

(30) Foreign Application Priority Data

Jul. 27, 2016 (JP) .................. 2016-147491

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01); *B60W 40/08* (2013.01);
(Continued)

(58) Field of Classification Search
CPC ...... B60W 30/09; B60W 40/08; B60W 10/20; B60W 10/18; B60W 2510/182; B60W 2040/0818; B60W 2710/182; B60W 2710/207; B60W 2520/14; B60W 2510/20; B60W 2710/202; B60W 2510/202; B60W 2720/14
See application file for complete search history.

(56) References Cited

U.S. PATENT DOCUMENTS

2015/0224998 A1* 8/2015 Prakah-Asante ..... B60W 50/12
  701/36
2017/0322558 A1* 11/2017 Teshima ................ B60K 28/06

FOREIGN PATENT DOCUMENTS

JP     H06-127286 A    5/1994
JP     2006-137215 A   6/2006
(Continued)

OTHER PUBLICATIONS

JP 2016/005933 Machine Translation (Year: 2016).*

*Primary Examiner* — Alan D Hutchinson
(74) *Attorney, Agent, or Firm* — Oliff PLC

(57) ABSTRACT

A driving control system for a vehicle is provided. The vehicle includes a steering device, a steering operation amount sensor that detects a steering operation amount of the driver, and an abnormality determining device configured to determine whether the driver is in an abnormal state. The driving control system includes: an actuator configured to adjust a turning state quantity; and an electronic control unit configured to calculate a target turning state quantity of the vehicle based on the steering operation amount and control the turning state quantity adjusting device. The electronic control unit is configured to correct the target turning state quantity such that a magnitude of the target turning state quantity does not exceed a predetermined allowable range and to control the actuator based on the corrected target turning state quantity when the driver is in the abnormal state.

9 Claims, 7 Drawing Sheets

(51) Int. Cl.
   *B60W 10/20* (2006.01)
   *B60W 40/08* (2012.01)
(52) U.S. Cl.
   CPC .............. *B60W 2040/0818* (2013.01); *B60W 2510/182* (2013.01); *B60W 2510/20* (2013.01); *B60W 2510/202* (2013.01); *B60W 2520/14* (2013.01); *B60W 2710/182* (2013.01); *B60W 2710/202* (2013.01); *B60W 2710/207* (2013.01); *B60W 2720/14* (2013.01)

(56) References Cited

FOREIGN PATENT DOCUMENTS

| | | |
|---|---|---|
| JP | 2006-282168 A | 10/2006 |
| JP | 2010-100120 A | 5/2010 |
| JP | 2010-264896 A | 11/2010 |
| JP | 2016-005933 A | 1/2016 |
| JP | 2016-045713 A | 4/2016 |

\* cited by examiner

DRIVING CONTROL SYSTEM FOR VEHICLE

INCORPORATION BY REFERENCE

The disclosure of Japanese Patent Application No. 2016-147491 filed on Jul. 27, 2016 including the specification, drawings and abstract is incorporated herein by reference in its entirety.

BACKGROUND

1. Technical Field

The present disclosure relates to a driving control system for a vehicle.

2. Description of Related Art

In order to improve traveling safety of a vehicle, a driving control system which is configured to give an alarm to a driver by applying a torque to a steering wheel based on a condition of a driver's steering operation when there is a likelihood that the vehicle will come into contact with an object near the vehicle is known, as described in Japanese Patent Application Publication No. 2010-264896 (JP 2010-264896 A). According to such a type of driving control system, in comparison with a case in which a condition of a driver's steering operation is not considered, it is possible to decrease concern that a driver's reflexive steering operation will be caused and to decrease concern that steering which is performed based on a driver's intention will be hindered.

When a body condition of a driver of a vehicle is disrupted during driving or the like and an abnormality in which the driver cannot drive the vehicle normally occurs, for example, the driver may perform an inappropriate steering operation unintentionally. In such a driving control system, it is not determined whether an abnormality occurs with a driver. Accordingly, even when an abnormality occurs with a driver, driving control is performed without considering the occurrence of the abnormality.

SUMMARY

Therefore, when a driver performs an inappropriate steering operation in a state in which an abnormality occurs with the driver and there is a likelihood that a vehicle will come into contact with an object near the vehicle, a torque may be applied to a steering wheel based on the inappropriate steering operation. Since application of a torque to the steering wheel is performed to give an alarm to the driver, turning wheels cannot be turned to avoid contact of the vehicle with the object near the vehicle against turning of the turning wheel due to the inappropriate steering operation.

It is conceivable that the driving control system described in JP 2010-264896 A could be applied to a vehicle including an abnormality determining device that determines whether a driver is in an abnormal state. In the vehicle including the abnormality determining device, when it is determined that a driver is in an abnormal state, the vehicle can be made to decelerate and stop by the driving control system. However, when an inappropriate steering operation is performed by a driver in an abnormal state, turning wheels cannot be turned to avoid contact of the vehicle with an object and departure of the vehicle from a lane in the course of stopping the vehicle.

In the driving control system described in JP 2010-264896 A, it is necessary to acquire surrounding information of the vehicle using a radar or the like and to determine whether there is a likelihood that the vehicle will come into contact with an object near the vehicle based on the acquired information. Accordingly, the driving control system described in JP 2010-264896 A cannot be applied to a vehicle in which a surrounding information acquiring device such as a radar or a CCD camera that acquires surrounding information of the vehicle is not mounted.

The disclosure provides a technique of preventing a vehicle from contacting with an object, lane departure, and the like when a driver is in an abnormal state during driving, or a technique of decelerating a vehicle while preventing a vehicle from contacting with an object, lane departure, and the like when a driver is in an abnormal state during driving.

An aspect of the disclosure provides a driving control system for a vehicle. The vehicle includes a steering device configured to change a turning angle of turning wheels based on a steering operation of a driver, a steering operation amount sensor configured to detect a steering operation amount of the driver, and an abnormality determining device configured to determine whether the driver is in an abnormal state. The driving control system according to the aspect of the disclosure includes: an actuator configured to adjust a turning state quantity of the vehicle without depending on a driving operation of the driver; and an electronic control unit configured to control the turning state quantity adjusting device. The electronic control unit is configured to calculate a target turning state quantity of the vehicle based on the steering operation amount. The electronic control unit is configured to correct the target turning state quantity such that a magnitude of the target turning state quantity does not exceed a predetermined allowable range and to control the actuator based on the corrected target turning state quantity when the abnormality determining device determines that the driver is in the abnormal state.

In the above aspect, the electronic control unit may be configured to decelerate the vehicle when the abnormality determining device determines that the driver is in the abnormal state.

According to this configuration, when it is determined that a driver is in an abnormal state, the target turning state quantity is corrected such that the magnitude of the target turning state quantity of the vehicle does not exceed the predetermined allowable range, and the turning state quantity adjusting device is controlled and the vehicle decelerates based on the corrected target turning state quantity.

Accordingly, the range in which the magnitude of the turning state quantity of the vehicle is changed is limited to a range corresponding to the predetermined allowable range. As a result, in comparison with a case in which the target turning state quantity is not corrected such that the magnitude of the target turning state quantity of the vehicle does not exceed the predetermined allowable range, it is possible to reduce concern about lane departure, contact with an object, and the like in the course of decelerating and stopping the vehicle.

The "turning state quantity of a vehicle" may be a yaw rate of the vehicle or a turning lateral acceleration of the vehicle. Accordingly, the "target turning state quantity" may be a target yaw rate when the turning state quantity of the vehicle is the yaw rate of the vehicle, and may be a target turning lateral acceleration when the turning state quantity of the vehicle is the turning lateral acceleration of the vehicle.

In the above aspect, the electronic control unit may be configured to correct the target turning state quantity such that the magnitude of the target turning state quantity does not exceed the predetermined allowable range and a magnitude of a change rate of the target turning state quantity does not exceed a predetermined allowable change rate when it is determined that the driver is in the abnormal state.

According to the above configuration, when it is determined that the driver is in an abnormal state, the target turning state quantity is corrected such that the magnitude of the target turning state quantity does not exceed the predetermined allowable range and the magnitude of the change rate of the target turning state quantity does not exceed the allowable change rate. Accordingly, the target turning state quantity is corrected such that the magnitude of the target turning state quantity of the vehicle does not exceed the predetermined allowable range, and the magnitude of the change rate of the turning state quantity of the vehicle is limited to a change rate corresponding to the allowable change rate. As a result, in comparison with a case in which the target turning state quantity is not corrected such that the magnitude of the change rate of the target turning state quantity does not exceed the allowable change rate, it is possible to reduce the magnitude of the change rate of the turning state quantity of the vehicle and to effectively reduce concern about lane departure, contact with another object, and the like.

In the above aspect, the electronic control unit may be configured to set the predetermined allowable range as a range between a sum of a reference turning state quantity and an allowable additional amount for upper limit calculation and a sum of the reference turning state quantity and an allowable additional amount for lower limit calculation when the target turning state quantity at a time when a determination result of a state of the driver by the abnormality determining device changes from normal to abnormal is defined as the reference turning state quantity.

The target turning state quantity of the vehicle before the driver is in the abnormal state is considered to be a value based on an appropriate steering operation based on appropriate determination of a normal driver. Accordingly, when the target turning state quantity of the vehicle after the driver is in the abnormal state is changed in a predetermined range which is set with the target turning state quantity of the vehicle at the time when the state of the driver is changed to be the abnormal state as a reference, it is expected to be possible to limit the change of the turning state quantity of the vehicle to a preferable range for preventing lane departure, contact with an object, and the like.

According to this configuration, the predetermined allowable range is set as a range between the sum of the reference turning state quantity and the allowable additional amount for upper limit calculation and the sum of the reference turning state quantity and the allowable additional amount for lower limit calculation. Accordingly, the predetermined allowable range can be set with respect to the reference turning state quantity. As a result, in comparison with a case in which the predetermined allowable range is set with respect to zero, it is possible to limit the change of the turning state quantity of the vehicle to a preferable range for preventing lane departure, contact with another object, and the like even when a driver is in an abnormal state in a state in which the vehicle turns.

In the above aspect, the electronic control unit may be configured to decrease a magnitude of at least one of the allowable additional amount for upper limit calculation and the allowable additional amount for lower limit calculation as a magnitude of the reference turning state quantity increases.

In general, as the magnitude of the reference turning state quantity increases, a curvature of a traveling lane increases and a vehicle speed increases. Accordingly, concern of the vehicle departing from the lane is considered to increase according to a change in turning state quantity of the vehicle.

According to the above configuration, as the magnitude of the reference turning state quantity increases, the magnitude of at least one of the allowable additional amount for upper limit calculation and the allowable additional amount for lower limit calculation decreases. Accordingly, it is possible to decrease the magnitude of the change rate of the turning state quantity of the vehicle by decreasing the magnitude of the change rate of the target turning state quantity of the vehicle as the magnitude of the reference turning state quantity increases. As a result, in comparison with a case in which the magnitude of at least one of the allowable additional amount for upper limit calculation and the allowable additional amount for lower limit calculation does not decrease as the magnitude of the reference turning state quantity increases, it is possible to reduce concern that the vehicle will depart from a lane earlier.

In the above aspect, the electronic control unit may be configured to decrease a magnitude of the allowable change rate as a magnitude of a reference turning state quantity increases when the target turning state quantity at a time when a determination result of a state of the driver by the abnormality determining device changes from normal to abnormal is defined as the reference turning state quantity.

According to the above configuration, as the magnitude of the reference turning state quantity increases, the allowable change rate decreases. Accordingly, as the magnitude of the reference turning state quantity increases and the concern that the vehicle will depart from the lane earlier increases, it is possible to decrease the magnitude of the allowable change rate of the target turning state quantity. As a result, in comparison with a case of control of decreasing the magnitude of the allowable change rate as the magnitude of the reference turning state quantity increases, it is possible to reduce concern that the vehicle will depart from a lane earlier.

In the above aspect, the actuator may be configured to adjust a yaw moment applied to the vehicle by controlling a difference in braking force between right and left wheels.

According to the above configuration, by controlling a difference in braking force between the right and left wheels to adjust the yaw moment which is applied to the vehicle, it is possible to adjust the turning state quantity of the vehicle. A vehicle of which braking forces of respective wheels can be individually controlled does not require a special device for adjusting the turning state quantity of the vehicle.

In the above aspect, the actuator may be configured to adjust a yaw moment applied to the vehicle by changing a turning angle of the turning wheels using the steering device.

According to the above configuration, by changing the turning angle of the turning wheels using the steering device and adjusting the yaw moment which is applied to the vehicle, it is possible to adjust the turning state quantity of the vehicle. Accordingly, a vehicle in which the turning angle of the turning wheels can be changed without depending on a driver's steering operation does not require a special device for adjusting the turning state quantity of the vehicle.

In the above aspect, the steering device may be a steer-by-wire steering device.

According to the above configuration, since the steering device is a steer-by-wire steering device, it is possible to change the turning angle of the turning wheels regardless of a position of a steering input device such as a steering wheel. Accordingly, for example, even in a state in which an upper body of a driver in an abnormal state is left on the steering input device and does not drive the steering input device, it is possible to adjust the turning state quantity of the vehicle and to reduce concern about lane departure, contact with another object, and the like.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, some exemplary embodiments of the present disclosure will be described in detail with reference to the accompanying drawings.

First Embodiment

Figure 1:
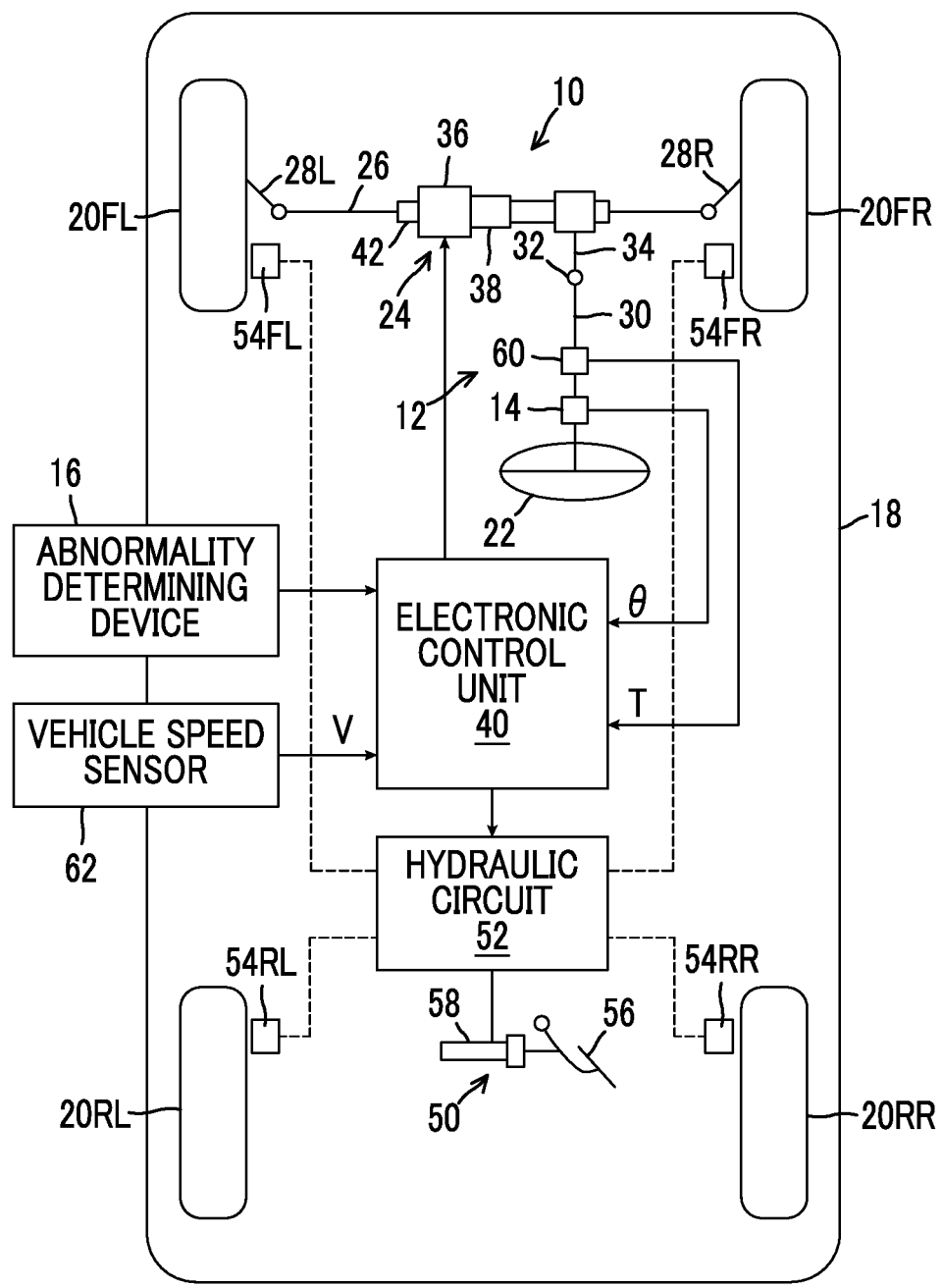
FIG. 1 is a diagram schematically illustrating a configuration of a driving control system for a vehicle according to a first embodiment of the present disclosure.

FIG. 1 is a diagram schematically illustrating a driving control system 10 for a vehicle according to a first embodiment of the present disclosure.

In FIG. 1, the driving control system 10 is applied to a vehicle 18 including a steering device 12, a steering angle sensor 14 which is a steering operation amount detecting device, and an abnormality determining device 16. The vehicle 18 includes right and left front wheels 20FL and 20FR which are turning wheels and right and left rear wheels 20RL and 20RR which are non-turning wheels. The steering device 12 is configured such that a turning angle of the front wheels 20FL and 20FR changes in response to a driver's steering operation, and driving forces are supplied to the front wheels 20FL and 20FR via a transmission from an engine, though this is not illustrated in FIG. 1. The vehicle to which the present disclosure is applied may be one of a front-wheel-drive vehicle, a rear-wheel-drive vehicle, and a four-wheel-drive vehicle.

The steering device 12 includes a rack-and-pinion electric power steering device 24 which is driven in response to a driver's operation of a steering wheel 22. A rack bar 26 of the electric power steering device 24 is connected to knuckle arms (not illustrated) of the front wheels 20FL and 20FR via tie rods 28L and 28R. The steering wheel 22 is connected to a pinion shaft 34 of the electric power steering device 24 via a steering shaft 30 and a universal joint 32.

In the embodiment illustrated in the drawing, the electric power steering device 24 is a rack-coaxial electric power steering device and includes an electric motor 36 and a conversion mechanism 38 such as a ball screw that converts a rotational torque of the electric motor 36 into a force in a reciprocating direction of the rack bar 26. The electric power steering device 24 is controlled by an electric power steering device (EPS) control unit of an electronic control unit 40. The electric power steering device 24 serves as an assist steering force generator that reduces a steering burden of a driver by generating an assist steering force for driving the rack bar 26 relative to a housing 42.

The assist steering force generator may have an arbitrary configuration as long as it can generate an assist steering force and may be, for example, a column-assist electric power steering device. A steering input device which is operated by a driver is the steering wheel 20, but the steering input device may be a joystick steering lever.

The abnormality determining device 16 is configured to determine whether a driver is in an abnormal state, that is, whether an abnormality in which a driver cannot drive the vehicle normally has occurred with the driver. The abnormality determining device 16 may be a device having an arbitrary configuration known in the art as long as it can determine whether a driver is in an abnormal state. An example of the abnormality determining device is described in Japanese Patent Application Publication No. 2016-45713.

Braking forces of the wheels are controlled by controlling pressures (that is, braking pressures) of wheel cylinders 54FL, 54FR, 54RL, and 54RR, using a hydraulic circuit 52 of a braking device 50. Although not illustrated in FIG. 1, the hydraulic circuit 52 includes an oil reservoir, an oil pump, and various valve units and the braking pressures of the wheel cylinders are controlled by a master cylinder 58 which is driven in response to a driver's depression of a brake pedal 56 at normal times. The braking pressures of the wheel cylinders are individually controlled by controlling the hydraulic circuit 52 using a braking force control unit of the electronic control unit 40 if necessary.

Accordingly, the braking device 50 can individually control the braking forces of the wheels without depending on the driver's braking operation and can adjust a yaw rate Yr which is a turning state quantity of the vehicle by applying a yaw moment to the vehicle 18 based on a difference in braking force between the right and left wheels. Accordingly, the braking device 50 also serves as a turning state quantity adjusting device of the driving control system 10, and the driving control unit of the electronic control unit 40 serves as a control device that controls the turning state quantity adjusting device.

As illustrated in FIG. 1, in the embodiment illustrated in the drawing, the steering angle sensor 14 is disposed in the steering shaft 30 and detects a steering angle θ, that is, a rotation angle of the steering shaft 30, as a steering operation amount from the driver. A steering torque sensor 60 that detects a steering torque T is provided in the steering shaft 30. A signal indicating the steering angle θ and a signal indicating the steering torque T are input to the driving control unit and the EPS control unit of the electronic control unit 40. A signal indicating whether the driver is in an abnormal state from the abnormality determining device 16 and a signal indicating a vehicle speed V detected by the vehicle speed sensor 62 are also input to the driving control unit and the EPS control unit of the electronic control unit 40, and both control units transmit and receive necessary signals to and from each other.

Each control unit of the electronic control unit 40 may include a microcomputer including a CPU, a ROM, a RAM, and input and output port units which are connected to each other via a bidirectional common bus. A driving control program is stored in the ROM and the driving control is performed by the CPU in accordance with the driving control program. The steering angle sensor 14 and the steering torque sensor 60 detect the steering angle θ and the steering torque T with steering in a left turning direction of the vehicle being positive.

Figure 2:
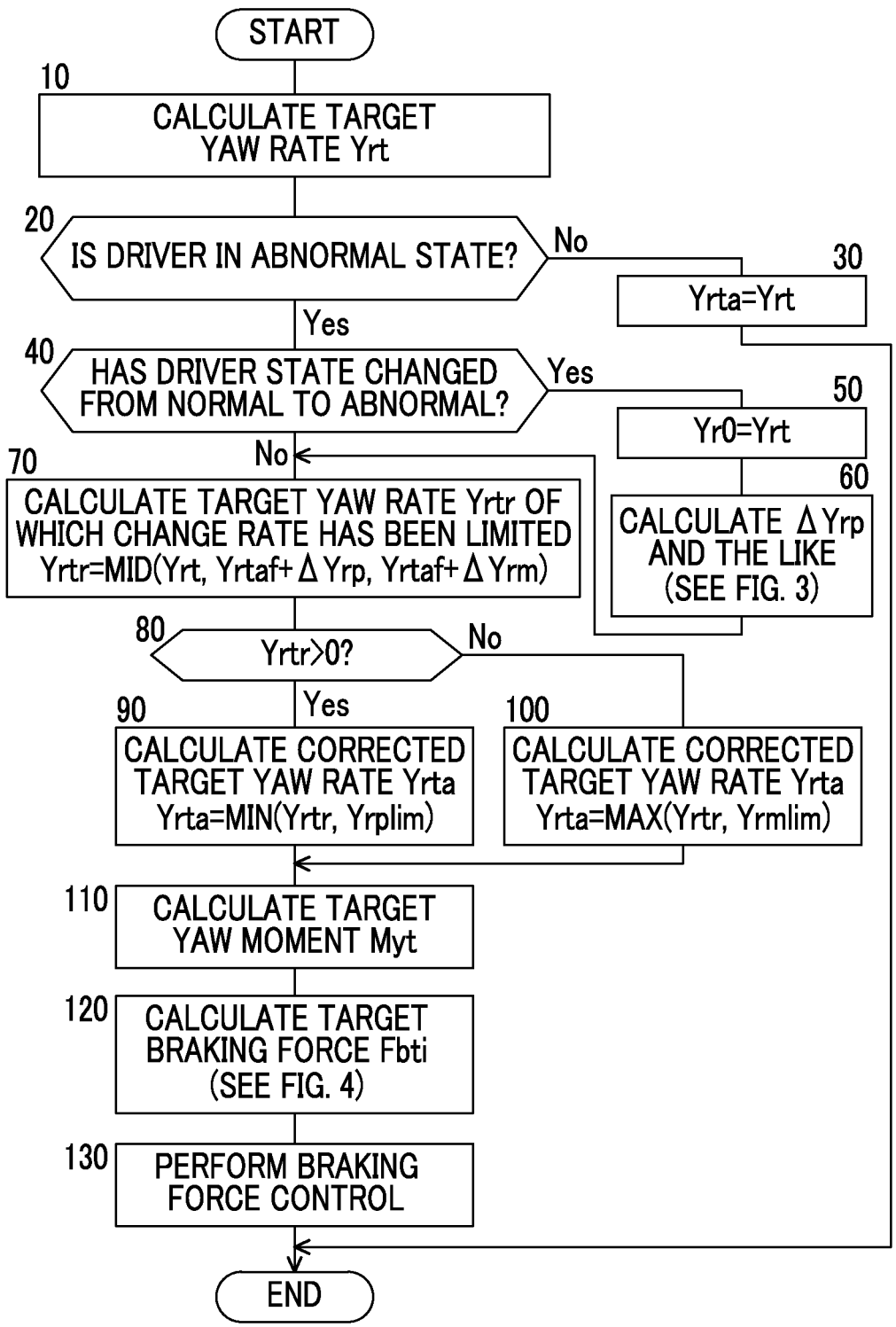
FIG. 2 is a flowchart illustrating a driving control routine according to the first embodiment.

As will be described in detail later, in the first embodiment, the driving control unit of the electronic control unit 40 performs the driving control in accordance with the flowchart illustrated in FIG. 2. The driving control unit calculates a target yaw rate Yrt of the vehicle based on the steering angle θ and the vehicle speed V. When the driver is in an abnormal state, the driving control unit calculates a corrected target yaw rate Yrta by correcting the target yaw rate Yrt such that the magnitude of a yaw rate of the vehicle does not exceed a predetermined allowable range and the magnitude of a change rate of the yaw rate of the vehicle does not exceed an allowable change rate. The driving control unit calculates a target yaw moment Myt of the vehicle based on the corrected target yaw rate Yrta, and controls a difference in braking force between the right and left wheels using the braking device 50 such that the yaw moment of the vehicle reaches the target yaw moment Myt.

<Driving Control Routine>

A driving control routine according to the first embodiment will be described below with reference to the flowchart illustrated in FIG. 2. The traveling control routine based on the flowchart illustrated in FIG. 2 is repeatedly performed at predetermined intervals when an ignition switch which is not illustrated in the drawing is in an ON state. Although not illustrated as a step in FIG. 2, the driving control routine may be ended when the vehicle stops. In the following description, the driving control based on the flowchart illustrated in FIG. 2 is simply referred to as "control." This is true of a second embodiment to be described later.

First, in Step 10, a target yaw rate Yrt of the vehicle 18 is calculated in the same way as known in the art based on the steering angle θ and the vehicle speed V.

In Step 20, the abnormality determining device 16 determines whether a driver is in an abnormal state. When the determination result is positive, the control transitions to Step 40. On the other hand, when the determination result is negative, a corrected target yaw rate Yrta is set to the target yaw rate Yrt calculated in Step 10 for preparation for calculation of Step 70 to be described later in Step 30, and then the control temporarily ends.

In Step 40, it is determined whether the determination result by the abnormality determining device 16 changes from a normal state to an abnormal state, that is, whether the determination result of Step 20 is negative or positive. The control transitions to Step 70 when the determination result is negative, and the control transitions to Step 50 when the determination result is positive.

In Step 50, a reference target yaw rate Yr0 which is a target yaw rate of the vehicle 18 when a situation in which the state of the driver is determined to be normal changes to a situation in which the state of the driver is determined to be abnormal is set to the target yaw rate Yrt calculated in Step 10.

Figure 3:
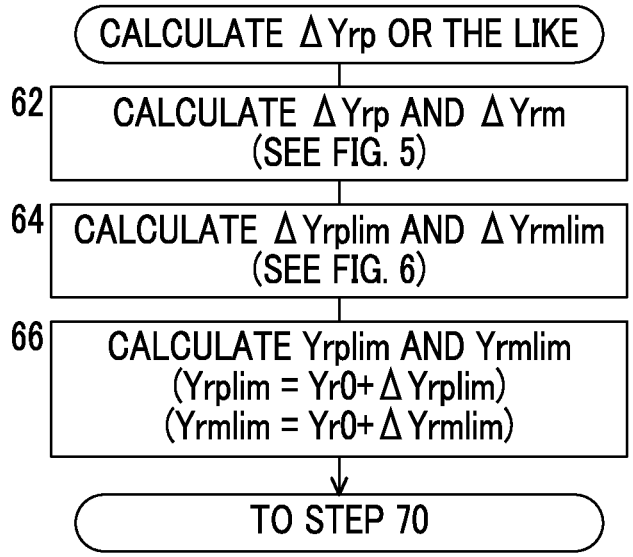
FIG. 3 is a flowchart illustrating a sub routine of calculating an increase ΔYrp of a target yaw rate which is performed in Step 60 of the flowchart illustrated in FIG. 2.

In Step 60, an allowable increase amount ΔYrp (a positive value) and an allowable decrease amount ΔYrm (a negative value) of the target yaw rate are calculated in accordance with the flowchart illustrated in FIG. 3. An allowable additional amount for upper limit calculation ΔYrplim (a positive value) and an allowable additional amount for lower limit calculation ΔYrmlim (a negative value) of the target yaw rate are calculated.

In Step 70, a target yaw rate Yrtr of which a change rate has been limited is calculated using Equation (1) with a previous value of the corrected target yaw rate Yrta as Yrtaf. In Equation (1), MID means a value (of which the magnitude is an intermediate value) other than a maximum value and a minimum value among three numerical values in the parenthesis.

$$Yrtr = MID(Yrt, Yrtaf + \Delta Yrp, Yrtaf + \Delta Yrm) \quad (1)$$

In Step 80, it is determined whether the target yaw rate Yrtr of which a change rate has been limited has a positive value, that is, whether a turning direction is a left turning direction. The control transitions to Step 100 when the determination result is negative, and the control transitions to Step 90 when the determination result is positive.

In Step 90, the corrected target yaw rate Yrta is calculated using Equation (2) with a sum of the reference target yaw rate Yr0 and the allowable additional amount for upper limit calculation ΔYrplim as an upper limit of the target yaw rate Yrplim. In Equation (2), MIN means the smaller value of two positive values in the parenthesis.

$$Yrta = MIN(Yrtr, Yrplim) \quad (2)$$

In Step 100, the corrected target yaw rate Yrta is calculated using Equation (3) with a sum of the reference target yaw rate Yr0 and the allowable additional amount for lower limit calculation ΔYrmlim as a lower limit of the target yaw rate Yrmlim. In Equation (3), MAX means the larger value (a value having the smaller absolute value) of two negative values in the parenthesis.

$$Yrta = MAX(Yrtr, Yrmlim) \quad (3)$$

In Step 110, the target yaw moment Myt of the vehicle 18 is calculated in the same way as known in the art based on a difference Yrta−Yrt between the corrected target yaw rate Yrta and the target yaw rate Yrt calculated in Step 10 as the yaw rate of the vehicle 18. The target yaw moment Myt is a yaw moment based on the difference in braking force between the right and left wheels for causing the yaw rate of the vehicle 18 to reach the corrected target yaw rate Yrta by acting on the vehicle 18 in addition to a turning yaw moment which is generated by turning lateral forces of the front wheels 20FL and 20FR.

Figure 4:
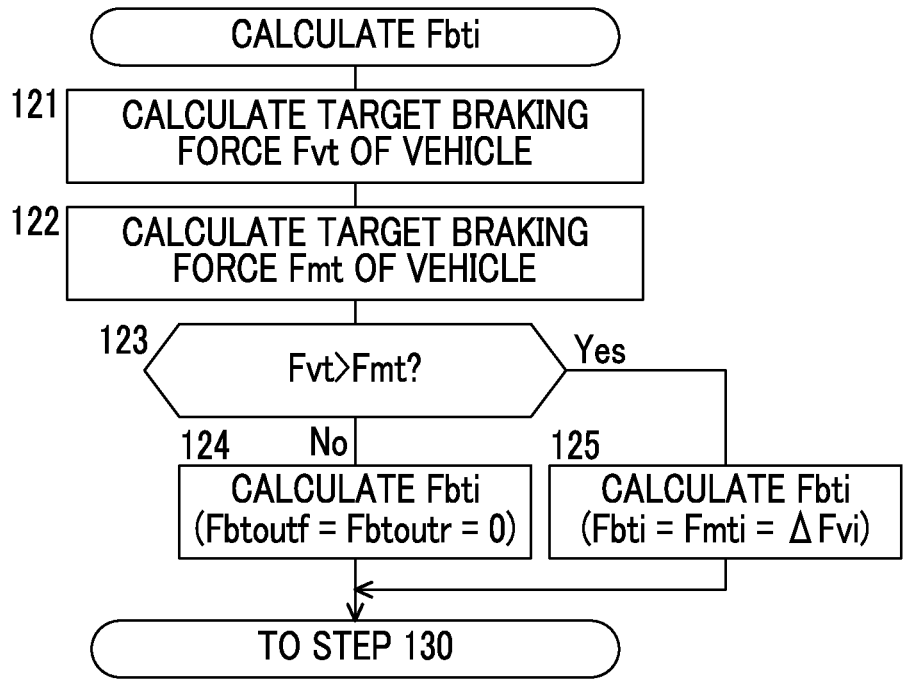
FIG. 4 is a flowchart illustrating a sub routine of calculating a target braking force Fbti which is performed in Step 120 of the flowchart illustrated in FIG. 2.

In Step 120, target braking forces Fbti (i=fl, fr, rl, and rr) of the left front wheel, the right front wheel, the left rear wheel and the right rear wheel for decelerating the vehicle 18 and causing the yaw moment of the vehicle 18 to reach the target yaw moment Myt are calculated in accordance with the flowchart illustrated in FIG. 4.

In Step 130, a command signal is output to the braking device 50 such that the braking forces of the wheels reach the corresponding target braking forces Fbti. Accordingly, the braking forces of the wheels are controlled such that the vehicle 18 is decelerated and the yaw moment of the vehicle 18 reaches the target yaw moment Myt by the difference in braking force between the right and left wheels.

Calculation of an increase amount ΔYrp of the target yaw rate will be described below with reference to the flowchart illustrated in FIG. 3.

Figure 5:
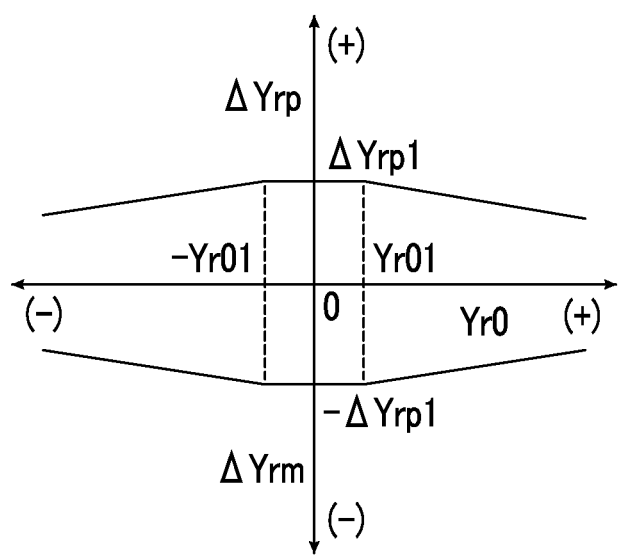
FIG. 5 is a map which is used to calculate an allowable increase amount ΔYrp and an allowable decrease amount ΔYrm of a target yaw rate based on a target yaw rate Yr0 of a vehicle at a time point at which a driver state changes from normal to abnormal.

First, in Step 62, an allowable increase amount ΔYrp and an allowable decrease amount ΔYrm of the target yaw rate are calculated with reference to the map illustrated in FIG. 5 based on the reference target yaw rate Yr0.

As illustrated in FIG. 5, the allowable increase amount ΔYrp has a positive value and is a constant value ΔYrp1 when the absolute value of the reference target yaw rate Yr0 is equal to or less than a reference value Yr01 (a positive integer). When the absolute value of the reference target yaw rate Yr0 is greater than the reference value Yr01, the allowable increase amount ΔYrp gradually decreases as the absolute value of the reference target yaw rate Yr0 increases. On the other hand, the allowable decrease amount ΔYrm has a negative value and is a constant value −ΔYrp1 when the absolute value of the reference target yaw rate Yr0 is equal to or less than the reference value Yr01. When the absolute value of the reference target yaw rate Yr0 is greater than the reference value Yr01, the allowable decrease amount ΔYrm gradually increases (the absolute value decreases) as the absolute value of the reference target yaw rate Yr0 increases.

Figure 6:
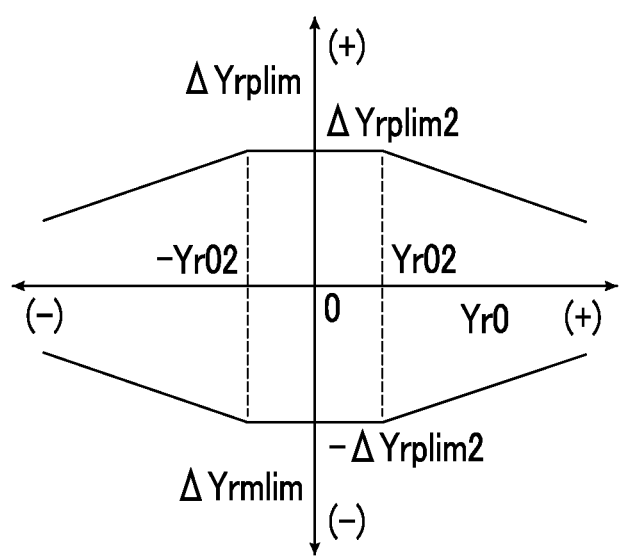
FIG. 6 is a map which is used to calculate an allowable additional amount for upper limit calculation ΔYrplim and an allowable additional amount for lower limit calculation ΔYrmlim of the target yaw rate based on the target yaw rate Yr0 of a vehicle at a time point at which a driver state changes from normal to abnormal.

In Step 64, the allowable additional amount for upper limit calculation ΔYrplim and the allowable additional amount for lower limit calculation ΔYrmlim of the target yaw rate are calculated with reference to the map illustrated in FIG. 6 based on the reference target yaw rate Yr0.

As illustrated in FIG. 6, the allowable additional amount for upper limit calculation ΔYrplim has a positive value and is a constant value ΔYrplim2 when the absolute value of the reference target yaw rate Yr0 is equal to or less than a reference value Yr02 (a positive integer). When the absolute value of the reference target yaw rate Yr0 is greater than the reference value Yr02, the allowable additional amount for upper limit calculation ΔYrplim gradually decreases as the absolute value of the reference target yaw rate Yr0 increases. On the other hand, the allowable additional amount for lower limit calculation ΔYrmlim has a negative value and is a constant value −ΔYrplim2 when the absolute value of the reference target yaw rate Yr0 is equal to or less than the reference value Yr02. When the absolute value of the reference target yaw rate Yr0 is greater than the reference value Yr02, the allowable additional amount for lower limit calculation ΔYrmlim gradually increases (the absolute value decreases) as the absolute value of the reference target yaw rate Yr0 increases.

In Step 66, the upper limit Yrplim of the target yaw rate is set to the sum Yr0+ΔYrplim of the reference target yaw rate Yr0 and the allowable additional amount for upper limit calculation ΔYrplim. Similarly, the lower limit Yrmlim of the target yaw rate is set to the sum Yr0+ΔYrmlim of the reference target yaw rate Yr0 and the allowable additional amount for lower limit calculation ΔYrmlim.

Calculation of the target braking force Fbti will be described below with reference to the flowchart illustrated n FIG. 4.

First, in Step 121, a target braking force Fvt of the vehicle for decelerating the vehicle and finally stopping the vehicle is calculated. The target braking force Fvt may be calculated to be greater as the vehicle speed V increases.

In Step 122, a target braking force Fmt of the vehicle is calculated as a minimum braking force of the vehicle required for achieving the target yaw moment Myt of the vehicle 18. For example, when a tread of the vehicle 18 is defined as Td, the target braking force Fmt is calculated by dividing the absolute value of the target yaw moment Myt by the tread Td.

In Step 123, it is determined whether the target braking force Fvt is greater than the target braking force Fmt, that is, whether a braking force greater than the minimum braking force of the vehicle required for achieving the target yaw moment Myt is necessary. The control transitions to Step 125 when the determination result is positive, and the control transitions to Step 124 when the determination result is negative.

In Step 124, target braking forces Fbtinf and Fbtinr of the front and rear wheels on a turning inside are calculated by distributing the target braking force Fmt to the front and rear wheels on the turning inside at a predetermined front-rear wheel distribution ratio. Target braking forces Fbtoutf and Fbtoutr of the front and rear wheels on a turning outside are set to 0.

In Step 125, a difference ΔFv (=Fvt−Fmt) between the target braking force Fvt and the target braking force Fmt is distributed to the front wheels and the rear wheels at the predetermined front-rear wheel distribution ratio. The distributed braking forces of the wheels ΔFvi (i=fl, fr, rl, and rr) are calculated by distributing the braking forces, which have been distributed to the front wheels and the rear wheels, to the right and left wheels. The target braking forces Fmti (i=fl, fr, rl, and rr) for achieving the target yaw moment Myt are calculated in the same way as described in Step 124, and the target braking forces Fbti of the wheels are calculated as the sum Fmti+ΔFvi of the target braking forces Fmti and the distributed braking forces ΔFvi.

Operation of First Embodiment (A) Case in which a Driver is in a Normal State

Since the determination result of Step 20 is negative, the processes of Step 40 and subsequent thereto are not performed. Accordingly, the yaw moment based on the difference in braking force between the right and left wheels is not applied to the vehicle 18, and the vehicle 18 turns by applying the turning yaw moment based on the turning lateral forces of the front wheels 20FL and 20FR which are the turning wheels.

(B) Case in which a Driver Changes from a Normal State to an Abnormal State

Since the determination results of Steps 20 and 40 are positive, Steps 50 and 60 are performed. In Step 50, the reference target yaw rate Yr0 is set to the target yaw rate Yrt calculated in Step 10. In Step 60, the allowable increase amount ΔYrp and the allowable decrease amount ΔYrm of the target yaw rate and the allowable additional amount for upper limit calculation ΔYrplim and the allowable additional amount for lower limit calculation ΔYrmlim of the target yaw rate are calculated.

The processes of Step 70 and subsequent thereto are performed. That is, the target yaw rate Yrtr of which a change rate has been limited is calculated in Step 70, and the corrected target yaw rate Yrta is calculated in Step 90 or 100. The target yaw moment Myt for causing the yaw rate of the vehicle 18 to reach the corrected target yaw rate Yrta is calculated in Step 110, and the braking forces of the wheels are controlled such that the yaw moment corresponding to the target yaw moment Myt is applied to the vehicle 18 in Steps 120 and 130.

(C) Case in which a Driver is in an Abnormal State

The determination results of Steps 20 and 40 are positive and negative, respectively, and the processes of Step 70 and subsequent thereto are performed similarly to Case (B).

(D) Case in which a Driver Changes from an Abnormal State to a Normal State

The determination result of Step 20 is negative. Accordingly, similarly to Case (A), the yaw moment based on the difference in braking force between the right and left wheels is not applied to the vehicle 18, and the vehicle 18 turns by applying the turning yaw moment based on the turning lateral forces of the front wheels 20FL and 20FR.

In Cases (B) and (C), the change rate of the target yaw moment of the vehicle is limited in Step 70, and the target yaw moment of the vehicle is limited to a value between the upper limit Yrplim and the lower limit Yrmlim in Step 90 or 100. Accordingly, even when a driver is in an abnormal state and the driver performs a sudden steering operation or the driver performs a steering operation with a large change in steering angle, it is possible to prevent the yaw rate of the vehicle from changing rapidly. As a result, it is possible to reduce concern of the vehicle departing from a lane or colliding with another vehicle or the like until the vehicle decelerates and stops.

Second Embodiment

Figure 7:
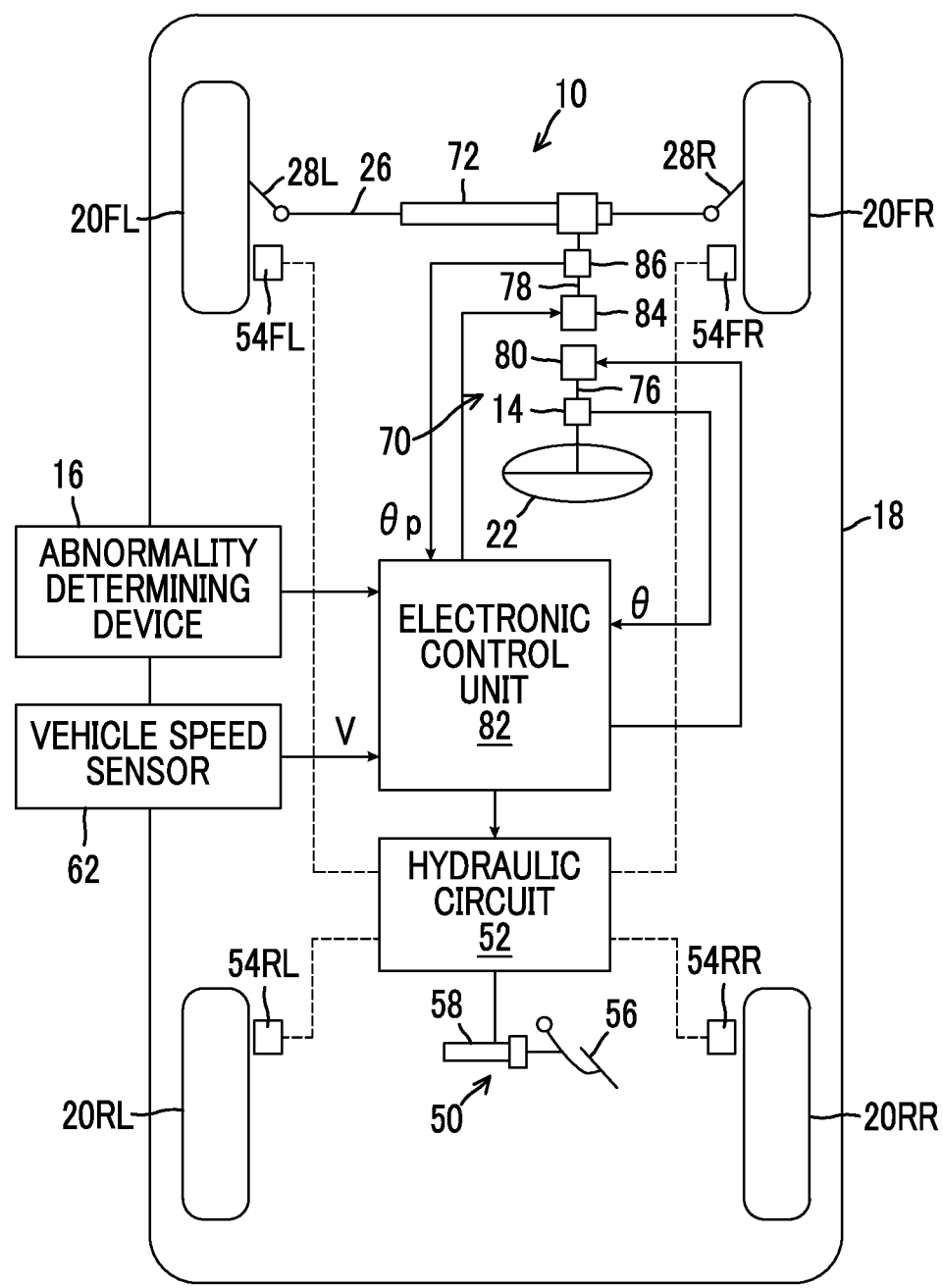
FIG. 7 is a diagram schematically illustrating a configuration of a driving control system for a vehicle according to a second embodiment of the present disclosure.

FIG. 7 is a diagram schematically illustrating a driving control system 10 for a vehicle according to a second embodiment of the present disclosure which is applied to a front-wheel-drive vehicle. In FIG. 7, the same elements as illustrated in FIG. 1 are referenced by the same reference numerals as illustrated in FIG. 1.

In the second embodiment, the vehicle 18 includes a steer-by-wire steering device 70 and the steering device 70 includes a rack-and-pinion steering mechanism 72. When a steering wheel 22 is operated by a driver, a rack bar 26 and tie rods 28L and 28R are driven by the steering mechanism 72, and thus the right and left front wheels 20FL and 20FR are turned.

A steering shaft 76 connected to the steering wheel 22 and a pinion shaft 78 of the steering mechanism 72 are not connected to each other. An electric motor 80 for applying a steering reaction torque is connected to the steering shaft 76 via a reduction gear mechanism which is not illustrated in FIG. 7. The electric motor 80 is controlled by a steering reaction control unit of an electronic control unit 82, and thus a necessary steering reaction torque is applied to the steering wheel 22. A turning electric motor 84 is connected to the pinion shaft 78 via a reduction gear mechanism which is not illustrated in FIG. 7. The electric motor 84 is controlled by a turning angle control unit of the electronic control unit 82, and thus the pinion shaft 78 is rotationally driven.

In the second embodiment, a rotational motion of the pinion shaft 78 is converted into a translational motion of the rack bar 26 by the rack-and-pinion steering mechanism 72 which is a rotation-translation motion converting mechanism, but the steering mechanism may have an arbitrary configuration known in the art.

As can be seen from the above description, the steering wheel 22, the steering mechanism 72, the electric motors 80 and 84, and the like constitute the steer-by-wire steering device 70 that turns the right and left front wheels 20FL and 20FR in response to a driver's steering operation. In this embodiment, as will be described later in detail, the steering device 70 also serves as a turning state quantity adjusting device that adjusts a yaw rate of the vehicle 18 by adjusting turning angles of the right and left front wheels 20FL and 20FR without depending on a driver's steering operation if necessary.

A steering angle sensor 14 that detects a steering angle θ is disposed in the steering shaft 76, and a signal indicating the steering angle θ detected by the steering angle sensor 14 is input to the electronic control unit 82. A signal indicating a vehicle speed V detected by a vehicle speed sensor 62 and a signal indicating a rotation angle θp of the pinion shaft 78 detected by a rotation angle sensor 86 are also input to the electronic control unit 82.

Each control unit of the electronic control unit 82 may include a microcomputer including a CPU, a ROM, a RAM, and input and output port units which are connected to each other via a bidirectional common bus. A driving control program is stored in the ROM and the driving control is performed by the CPU in accordance with the driving control program. The steering angle sensor 14 and the rotation angle sensor 86 detect the steering angle θ and the rotation angle θp with steering in a left turning direction of the vehicle being positive.

As will be described in detail later, the electronic control unit 82 performs the driving control in accordance with the flowchart illustrated in FIG. 8. The electronic control unit 82 calculates a target yaw rate Yrt of the vehicle based on the steering angle θ and the vehicle speed V in the same way as described in the first embodiment. When a driver is in an abnormal state, the electronic control unit 82 calculates a corrected target yaw rate Yrta by correcting the target yaw rate Yrt such that the magnitude of a yaw rate of the vehicle does not exceed a predetermined allowable range and the magnitude of a change rate of the yaw rate of the vehicle does not exceed an allowable change rate. The electronic control unit 82 calculates a target yaw moment Myt of the vehicle based on the corrected target yaw rate Yrta, and controls the turning angles of the right and left front wheels 20FL and 20FR by controlling the electric motor 84 of the steering device 70 such that the yaw moment of the vehicle reaches the target yaw moment Myt.

<Driving Control Routine>

A driving control routine according to the second embodiment will be described below with reference to the flowchart illustrated in FIG. 8. In FIG. 8, the same steps as illustrated in FIG. 2 are referenced by the same step numbers as illustrated in FIG. 2.

Figure 8:
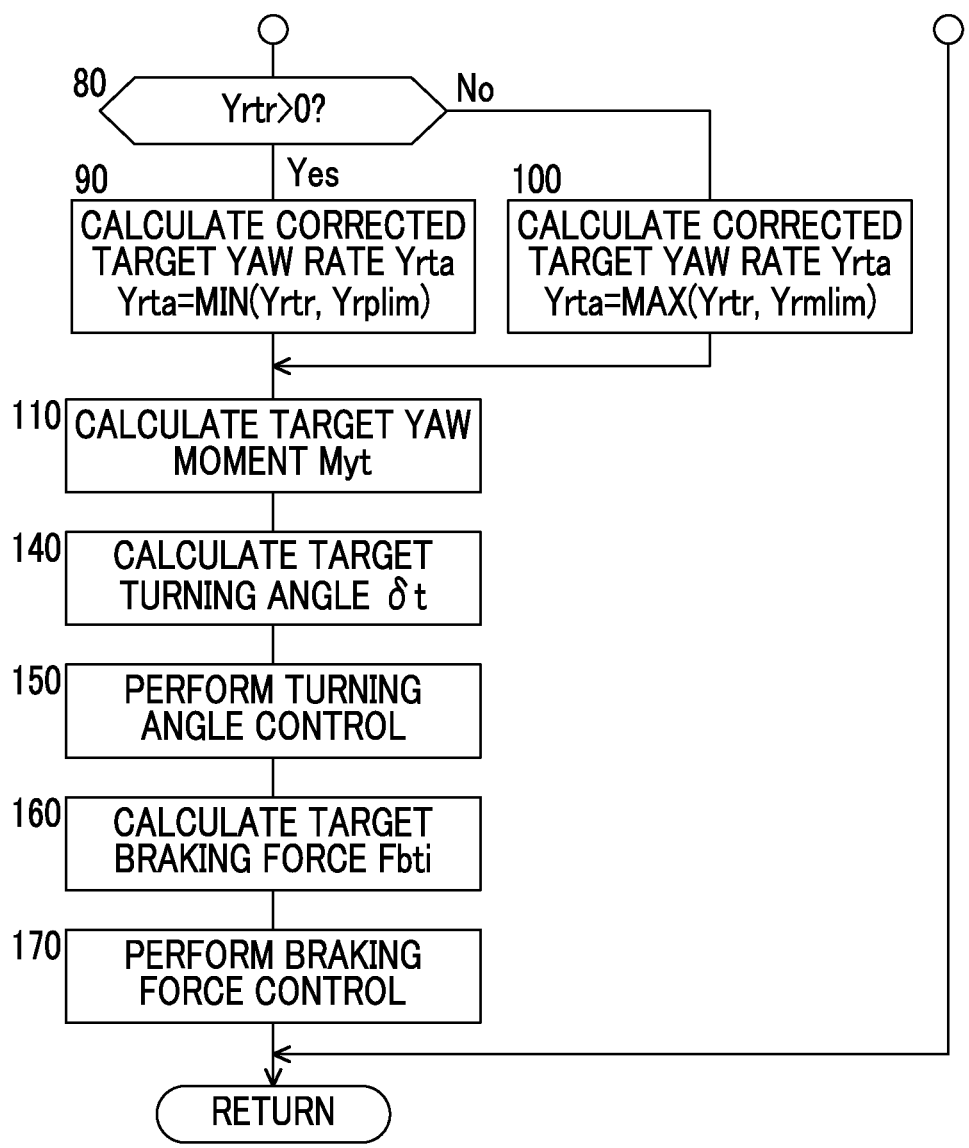
FIG. 8 is a flowchart illustrating a principal part of a driving control routine according to the second embodiment.

In FIG. 8, Steps 10 to 70 are not illustrated, but Steps 10 to 110 are performed in the same way as in the first embodiment. When Step 110 is completed, the control transitions to Step 140. In Step 110 of the second embodiment, the target yaw moment Myt of the vehicle is calculated as a yaw moment which should be generated by the turning lateral forces of the front wheels 20FL and 20FR.

In Step 140, a target turning angle δt of the front wheels 20FL and 20FR for achieving the target yaw moment Myt of the vehicle is calculated in the same way as known in the art based on the target yaw moment Myt and the vehicle speed V.

In Step 150, the electric motor 84 of the steering device 70 is controlled such that the turning angle of the front wheels 20FL and 20FR reaches the target turning angle δt.

In Step 160, similarly to Step 121 in the first embodiment, the target braking force Fvt of the vehicle for decelerating the vehicle and finally stopping the vehicle is calculated. The target braking force Fvt may be calculated to increase as the vehicle speed V increases. By distributing the target braking force Fvt to the front wheels and the rear wheels at a predetermined front-rear wheel distribution ratio and uniformly distributing the braking forces, which have been distributed to the front wheels and the rear wheels, to the right and left wheels, the target braking forces of the wheels ΔFbti (i=fl, fr, rl, and rr) are calculated.

In Step 170, a command signal is output to the braking device 50 such that the braking forces of the wheels reach the corresponding target braking forces Fbti, and the braking force of the vehicle 18 as a whole is controlled such that it reaches the target braking force Fvt.

Operation of Second Embodiment

The operations of the second embodiment in operations (A) to (D) basically are the same as those of the first embodiment, except that the turning angle of the front wheels 20FL and 20FR is controlled by controlling the electric motor 84 of the steering device 70 such that the yaw moment of the vehicle reaches the target yaw moment Myt in Cases (B) and (C).

Specific Examples of First and Second Embodiments

Figure 9:
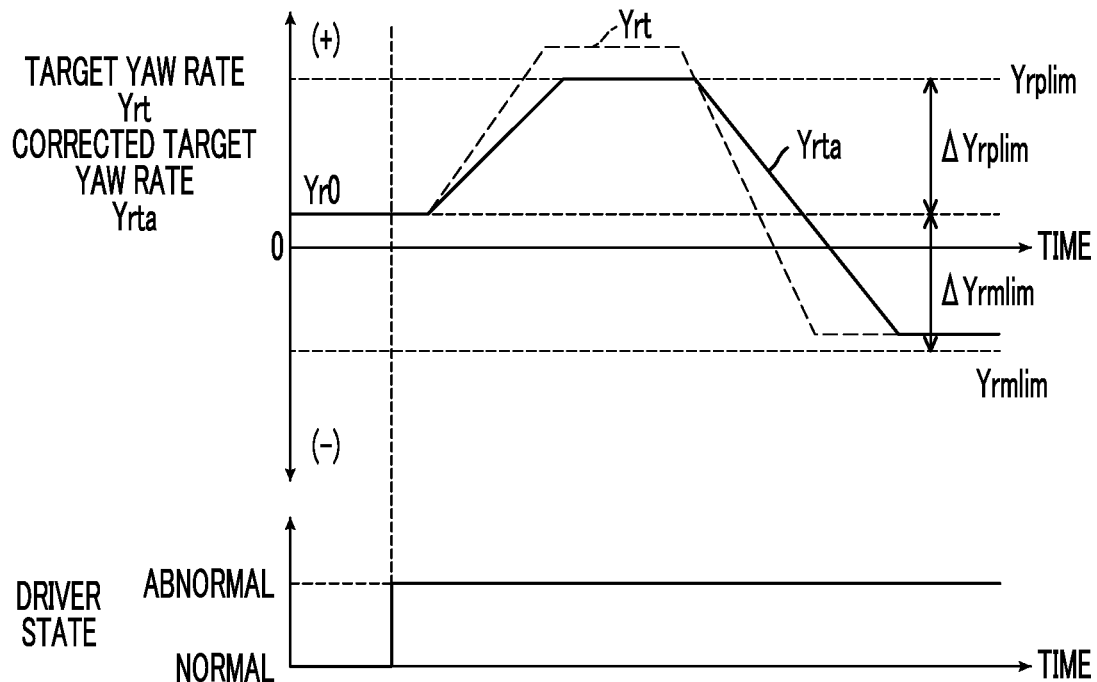
FIG. 9 is a timing chart illustrating an example of an operation in the first and second embodiments in a case in which the target yaw rate Yr0 of the vehicle has a positive value at a time point at which a driver state changes from normal to abnormal.
Figure 10:
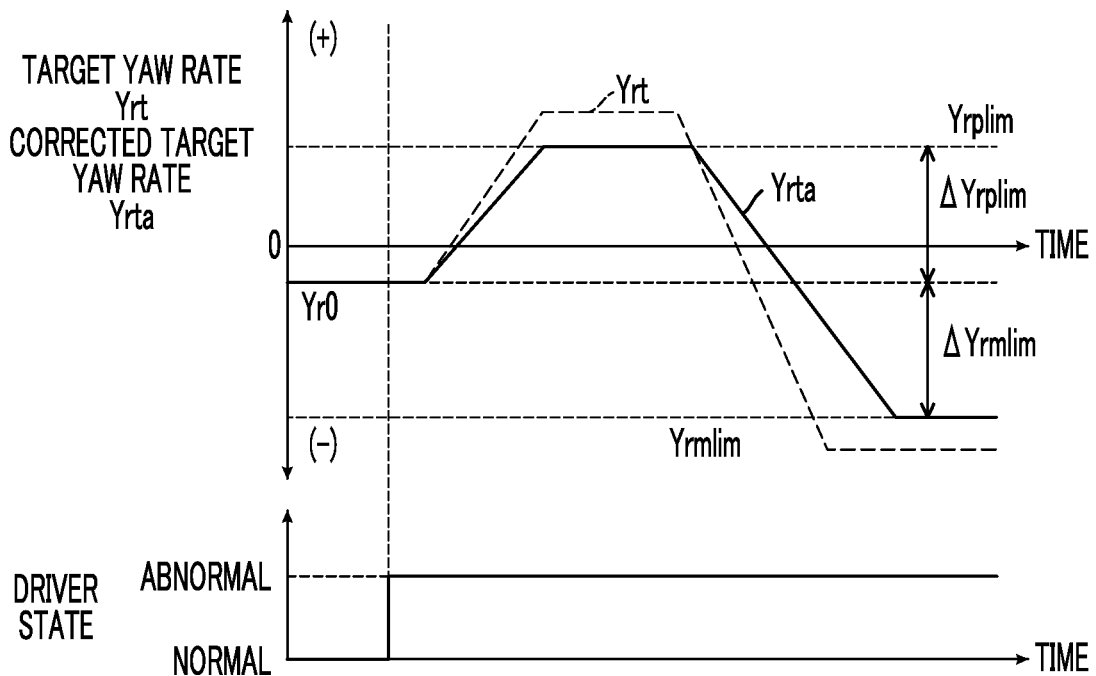
FIG. 10 is a timing chart illustrating an example of an operation in the first and second embodiments in a case in which the target yaw rate Yr0 of the vehicle has a negative value at a time point at which a driver state changes from normal to abnormal.

Specific operation examples of the first and second embodiments will be described below with reference to FIGS. 9 and 10. FIGS. 9 and 10 are timing charts illustrating an operation example of the first and second embodiments in cases in which the reference target yaw rate Yr0 has a positive value and a negative value. As illustrated in FIGS. 9 and 10, it is assumed that after a driver has changed to an abnormal state, the driver steers the steering wheel rapidly greatly in the left turning direction and then steers the steering wheel rapidly greatly in the right turning direction.

In the example illustrated in FIG. 9, since the reference target yaw rate Yr0 has a positive value, the upper limit Yrplim is greater than the allowable additional amount for upper limit calculation ΔYrplim and the lower limit Yrmlim is smaller than the allowable additional amount for lower limit calculation ΔYrmlim. However, since the target yaw rate Yrt increases rapidly and becomes greater than the upper limit Yrplim, an increase rate of the corrected target yaw rate Yrta becomes less than an increase rate of the target yaw rate Yrt and the corrected target yaw rate Yrta is limited such that it is not greater than the upper limit Yrplim. The target yaw rate Yrt decreases rapidly after reaching a maximum value, but a decrease rate of the corrected target yaw rate Yrta becomes less than a decrease rate of the target yaw rate Yrt.

In the example illustrated in FIG. 10, since the reference target yaw rate Yr0 has a negative value, the upper limit Yrplim is smaller than the allowable additional amount for upper limit calculation ΔYrplim and the lower limit Yrmlim is larger than the allowable additional amount for lower limit calculation ΔYrmlim. Accordingly, the increase rate of the corrected target yaw rate Yrta is less than the increase rate of the target yaw rate Yrt, and the corrected target yaw rate Yrta becomes a value limited by the upper limit Yrplim even when the target yaw rate Yrt in the left turning direction is less than that in the example illustrated in FIG. 9. Even when the target yaw rate Yrt decreases rapidly after reaching the maximum value, the decrease rate of the corrected target yaw rate Yrta is less than the decrease rate of the target yaw rate Yrt. In a step in which the target yaw rate Yrt in the right turning direction becomes larger than that in the example illustrated in FIG. 9, the corrected target yaw rate Yrta becomes a value limited by the lower limit Yrmlim.

According to the first and second embodiments, even when a driver is in an abnormal state and the steering angle changes greatly, for example, due to an unintentional steering operation, the change rate and the magnitude of the yaw rate of the vehicle are limited. Accordingly, in comparison with a case in which the change rate and the magnitude of the yaw rate of the vehicle are not limited, it is possible to decrease a degree of increase in the change rate and the magnitude of the yaw rate of the vehicle due to an inappropriate steering operation by a driver in an abnormal state. As a result, until the vehicle stops, it is possible to reduce concern of the vehicle departing from a lane and concern of the vehicle colliding with another vehicle or the like.

According to the first and second embodiments, it is not necessary to provide a device that understands surrounding conditions of the vehicle 18 such as a CCD camera and it is not necessary to perform lane departure prevention control of controlling a relation of the vehicle 18 relative to a lane. Accordingly, in comparison with a case in which lane departure prevention control or the like is performed in a vehicle, it is possible to reduce concern of the vehicle departing from a lane and concern of the vehicle colliding with another vehicle or the like with a simple and inexpensive structure when a driver is in an abnormal state and the vehicle stops.

According to the first and second embodiments, the upper limit Yrplim and the lower limit Yrmlim for determining an allowable range of the target yaw rate of the vehicle when a driver is in an abnormal state are set to the sum Yr0+ΔYrplim and the sum Yr0+ΔYrmlim, respectively, with respect to the reference target yaw rate Yr0. Accordingly, in comparison with a case in which the allowable range of the target yaw rate of the vehicle is set with respect to zero regardless of the target yaw rate of the vehicle when a driver changes from a normal state to an abnormal state, it is possible to reduce concern of the target yaw rate of the vehicle varying in an inappropriate range. As a result, in comparison with a case in which the allowable range of the target yaw rate of the vehicle is set with respect to zero, it is possible to effectively reduce concern of the vehicle departing from a lane and concern of the vehicle colliding with another vehicle or the like.

Particularly, as illustrated in FIG. 5, the magnitudes of the increase amount ΔYrp and the decrease amount ΔYrm that determine the change rate of the target yaw rate decrease gradually as the absolute value of the reference target yaw rate Yr0 increases when the absolute value of the reference target yaw rate Yr0 is greater than the reference value Yr01. Accordingly, as the absolute value of the reference target yaw rate Yr0 increases, it is possible to decrease the magnitude of the change rate of the corrected target yaw rate Yrta and to decrease the degree of change of the corrected target yaw rate Yrta.

As illustrated in FIG. 6, the magnitudes of the allowable additional amount for upper limit calculation ΔYrplim and the allowable additional amount for lower limit calculation ΔYrmlim decrease gradually as the absolute value of the reference target yaw rate Yr0 increases when the absolute value of the reference target yaw rate Yr0 is greater than the reference value Yr02. Accordingly, as the absolute value of the reference target yaw rate Yr0 increases, it is possible to decrease the maximum value of the magnitude of the corrected target yaw rate Yrta and to decrease the magnitude of the allowable change range of the corrected target yaw rate Yrta.

Particularly, the target yaw moment Myt is generated by controlling the braking forces of the wheels in the first embodiment, and is generated by changing the turning angle of the front wheels 20FL and 20FR without rotating the steering wheel 22 in the second embodiment. Accordingly, for example, even when an upper body of a driver is left on the steering wheel 22 and cannot rotate the steering wheel 22, it is possible to generate a yaw moment corresponding to the target yaw moment Myt.

While the present disclosure has been described above with reference to specific embodiments, the present disclosure is not limited to the above-mentioned embodiments and it will be apparent to those skilled in the art that the present disclosure can be modified in various forms without departing from the scope of the present disclosure.

For example, in the above-mentioned embodiments, the yaw rate of a vehicle is used as the "turning state quantity of a vehicle," but the yaw rate of a vehicle may be replaced with turning lateral acceleration of the vehicle. In this case, target turning lateral acceleration may be used as the "target turning state quantity."

In the above-mentioned embodiments, the magnitudes of the increase amount ΔYrp and the decrease amount ΔYrm that determine the change rate of the target yaw rate decrease gradually as the absolute value of the reference target yaw rate Yr0 increases when the absolute value of the reference target yaw rate Yr0 is greater than the reference value Yr01 as illustrated in FIG. 5. However, the magnitude of at least one of the increase amount ΔYrp and the decrease amount ΔYrm may be set to be constant in at least one of an area in which the reference target yaw rate Yr0 has a positive value and an area in which the reference target yaw rate Yr0 has a negative value.

In the above-mentioned embodiments, the magnitudes of the allowable additional amount for upper limit calculation ΔYrplim and the allowable additional amount for lower limit calculation ΔYrmlim that determine the allowable range of the target yaw rate decrease gradually as the absolute value of the reference target yaw rate Yr0 increases when the absolute value of the reference target yaw rate Yr0 is greater than the reference value Yr02 as illustrated in FIG. 6. However, the magnitude of at least one of the allowable additional amount for upper limit calculation ΔYrplim and the allowable additional amount for lower limit calculation ΔYrmlim may be set to be constant in at least one of an area in which the reference target yaw rate Yr0 has a positive value and an area in which the reference target yaw rate Yr0 has a negative value.

In the first embodiment, the yaw moment of the vehicle is controlled such that it reaches the target yaw moment Myt by controlling the braking forces of the wheels. However, the yaw moment of the vehicle may be controlled such that it reaches the target yaw moment Myt by controlling the braking forces of the wheels and the driving forces of the driving wheels.

Particularly, in the first embodiment, when the target braking force Fvt is equal to or less than the target braking force Fmt, the target braking force Fmt is distributed to the front and rear wheels on the turning inside and thus the deceleration of the vehicle is higher than the deceleration corresponding to the target braking force Fvt. Accordingly, the braking forces of the wheels may be controlled such that the target yaw moment Myt is achieved by the braking forces of the turning inside wheels and the driving forces of the turning outside wheels and the braking force of the vehicle as a whole reaches the target braking force Fvt.

In the second embodiment, the steering device is a steer-by-wire steering device 70 and can change the turning angle of the front wheels 20FL and 20FR without rotating the steering wheel 22. However, when the electric power steering device 24 is included in the steering device 12 as in the first embodiment and the output power of the electric power steering device is high, the turning angle of the front wheels 20FL and 20FR may be changed by the electric power steering device.

The configurations of the first and second embodiments may be combined. In this case, it is possible to reduce control quantities in the controls of the above-mentioned embodiments in comparison with the control quantities in each embodiment.

In the first and second embodiments, a device that detects surroundings of the vehicle such as a camera is not provided in the vehicle. However, the vehicle may include a camera or the like and may independently include a system that performs braking for avoiding collision and steering control based on information from the camera or the like.

What is claimed is:

1. A driving control system for a vehicle, the vehicle including a steering device configured to change a turning angle of turning wheels based on a steering operation of a driver, a steering operation amount sensor configured to detect a steering operation amount of the driver, and an abnormality determining device configured to determine whether the driver is in an abnormal state, the driving control system comprising:

an actuator configured to adjust a turning state quantity of the vehicle without depending on a driving operation of the driver; and an electronic control unit configured to control the actuator, wherein the electronic control unit is configured to:

calculate a target turning state quantity of the vehicle based on the steering operation amount; and when a magnitude of the target turning state quantity exceeds a predetermined allowable range, calculate a corrected target turning state quantity equal to one of (i) an upper limit of the predetermined allowable range and (ii) a lower limit of the predetermined allowable range, and control the actuator based on the corrected target turning state quantity when the abnormality determining device determines that the driver is in the abnormal state.

2. The driving control system for the vehicle according to claim 1, wherein the electronic control unit is configured to decelerate the vehicle when the abnormality determining device determines that the driver is in the abnormal state.

3. The driving control system for the vehicle according to claim 1, wherein the electronic control unit is configured to calculate the corrected target turning state quantity such that a magnitude of a change rate of the corrected target turning state quantity does not exceed a predetermined allowable change rate when it is determined that the driver is in the abnormal state.

4. The driving control system for the vehicle according to claim 3, wherein
the electronic control unit is configured to decrease a magnitude of the predetermined allowable change rate as a magnitude of a reference turning state quantity increases, the reference turning state quantity being defined as the target turning state quantity at a time when a determination result of a state of the driver by the abnormality determining device changes from normal to abnormal.

5. The driving control system for the vehicle according to claim 1, wherein
the electronic control unit is configured to set the predetermined allowable range as a range between a sum of a reference turning state quantity and an allowable additional amount for upper-limit calculation and a sum of the reference turning state quantity and an allowable additional amount for lower-limit calculation when the reference turning state quantity is defined as the target turning state quantity at a time when a determination result of a state of the driver by the abnormality determining device changes from normal to abnormal.

6. The driving control system for the vehicle according to claim 5, wherein
the electronic control unit is configured to decrease a magnitude of at least one of the allowable additional amount for upper-limit calculation and the allowable additional amount for lower-limit calculation as a magnitude of the reference turning state quantity increases.

7. The driving control system for the vehicle according to claim 1, wherein
the actuator is configured to adjust a yaw moment applied to the vehicle by controlling a difference in braking force between right and left wheels.

8. The driving control system for the vehicle according to claim 1, wherein
the actuator is configured to adjust a yaw moment applied to the vehicle by changing a turning angle of the turning wheels using the steering device.

9. The driving control system for the vehicle according to claim 8, wherein
the steering device is a steer-by-wire steering device.

* * * * *